(12) United States Patent
Patrissi et al.

(10) Patent No.: US 12,166,247 B1
(45) Date of Patent: Dec. 10, 2024

(54) HERMETIC SEAL IN ANODE POUCH FOR LITHIUM-SEAWATER ELECTROCHEMICAL BATTERY

(71) Applicant: The United States of America as represented by the Secretary of the Navy, Newport, RI (US)

(72) Inventors: Charles J Patrissi, Newport, RI (US); Jennifer R Rizzo, Portsmouth, RI (US); Christian R Schumacher, Newport, RI (US)

(73) Assignee: The United States of America as represented by the Secretary of the Navy

( * ) Notice: Subject to any disclaimer, the term of this patent is extended or adjusted under 35 U.S.C. 154(b) by 225 days.

(21) Appl. No.: 17/489,946

(22) Filed: Sep. 30, 2021

(51) Int. Cl.
*H01M 6/02* (2006.01)
*H01M 4/02* (2006.01)
*H01M 4/76* (2006.01)
*H01M 6/18* (2006.01)
*H01M 6/34* (2006.01)

(52) U.S. Cl.
CPC ............. *H01M 6/02* (2013.01); *H01M 4/76* (2013.01); *H01M 6/187* (2013.01); *H01M 6/188* (2013.01); *H01M 6/34* (2013.01); *H01M 2004/027* (2013.01)

(58) Field of Classification Search
CPC .. H01M 6/02; H01M 6/34; H01M 6/187–188; H01M 4/76; H01M 2004/027
See application file for complete search history.

(56) References Cited

U.S. PATENT DOCUMENTS

| | | | |
|---|---|---|---|
| 2009/0081115 A1* | 3/2009 | Ross | C01B 13/02 423/579 |
| 2015/0004457 A1* | 1/2015 | Visco | H01M 6/34 429/119 |
| 2021/0242469 A1* | 8/2021 | Lee | H01M 4/8896 |

(Continued)

FOREIGN PATENT DOCUMENTS

CN 213502645 U * 6/2021

OTHER PUBLICATIONS

Machine translation of CN 213502645 U, Jun. 2021 (Year: 2021).*

(Continued)

*Primary Examiner* — Matthew T Martin
*Assistant Examiner* — Unique Jenevieve Luna
(74) *Attorney, Agent, or Firm* — James M. Kasischke; Michael P. Stanley; Jeffry C. Severson

(57) ABSTRACT

A method is provided for making a ceramic lithium ion conducting membrane and for making an anode pouch for a lithium-seawater battery. The method for making the ceramic membrane includes adding pore formers into a liquid slurry of LTAP ($Li_2O$—$Al_2O_3$—$SiO_2$—$P_2O_5$—$TiO_2$) powder. The liquid slurry is converted into porous green tape and the porous green tape is laminated onto the top of nonporous green tapes to form a stack. The stack is sintered and the pore formers are decomposed to create pores in the top layer of the ceramic membrane. The porous ceramic membrane is used to create a more robust hermetic seal in an anode pouch for the battery compared to a seal made with a nonporous ceramic membrane.

3 Claims, 6 Drawing Sheets

(56) References Cited

U.S. PATENT DOCUMENTS

2021/0257658 A1\* 8/2021 Wachsman .......... H01M 10/058

OTHER PUBLICATIONS

Christian Schumacher, Charles J. Patrissi, Lithium-Seawater Battery for Undersea Sensors and Vehicles, presentation, Jun. 14, 2010, pp. 1-33, Newport, RI, USA.

Christian R. Schumacher, Charles J. Patrissi, Steven P. TUCKER, Lithium-Seawater Battery for Undersea Sensors and Vehicles, Tech Paper, pp. 1-4, Newport, RI, USA.

\* cited by examiner

HERMETIC SEAL IN ANODE POUCH FOR LITHIUM-SEAWATER ELECTROCHEMICAL BATTERY

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The present invention is a method to increase the strength and durability of an adhesive bond or seal between a solid ceramic electrolyte membrane and a flexible, multilayer laminate film, and the increased strength bond created by the method. The invention is particularly useful for anode pouches for lithium-seawater batteries.

(2) Description of the Related Art

FIG. 1 is a schematic illustration of a conventional lithium-seawater battery 20. Battery 20 includes an anode 22 made of lithium and a cathode 24 made of, for example, carbon, titanium, platinum coated nickel or other suitable materials. Battery 20 supplies power for an electrical load 26. The battery 20 is immersed in seawater 28 that functions as a catholyte. (This type of battery will also work in fresh water but with higher resistance until the concentration of ions increases.) The lithium anode 22 is encased in an anode pouch 30. A porous polymer membrane 32 is disposed between the lithium anode 22 and a lithium ion conducting glass ceramic membrane 34. Open volume surrounding the lithium disk 22 is filled with an aprotic organic solvent. Surface 36 of ceramic membrane 34 contacts the seawater 28 and is where ions are transmitted from the lithium anode 22 through the ceramic membrane 34 to the seawater 28. An annular laminate face ring 38 provides a seal between the seawater-contacting side 36 of the ceramic membrane 34 and the remainder of anode pouch 30. The seal is important to the service life of battery 20.

FIG. 2 schematically illustrates the annular laminate face ring 38 placed over the ceramic membrane 34 having a diameter A. Membrane 34 is partially hidden behind annular face laminate ring 38. Face ring 38 has a circular opening 40 of diameter B that forms the "window" for seawater-contacting face 36 of ceramic membrane 34 to contact the seawater 28. The overlapping annular area between ceramic membrane 34 and face ring 38 has a width of (A–B)/2 and is the sealing area between the ceramic membrane and the face ring. The main leak path during long-term exposure of the battery 20 to seawater is through this overlapping annular sealing area between the ceramic membrane 34 and the face ring 38. The improvement of the strength and durability of the annular bond or seal between the ceramic membrane 34 and the face ring 38 is the principal purpose of the present invention.

A useful adhesive bond must resist the mechanical forces that act on the bond and must resist the environment to which the bond is exposed. Environmental resistance is a measure of the bond's durability. The components of bond strength are adhesion and cohesion.

There are five different theories used to explain adhesion. The oldest theory or model describes adhesion in terms of the mechanical interlocking of an adhesive into the pores and around the other irregularities of a surface. The mechanical adhesion model depends on sufficient wetting of the surface and proper adhesive rheology in order to fill the pores and surrounding surface irregularities.

In addition to mechanical adhesion, there are four models of chemical adhesion that describe the various interactions between the adhesive and adherend at the molecular and atomic levels. These interactions range from strong (covalent) to very weak (van der Waals attractions) and are discussed in terms of the force required to separate them normalized by the active surface area of bond. One common method for increasing chemical adhesion-related bond strength is to increase the active surface area of the adherend over a given geometric area. By doing so, the adhesive force increases over that geometric area.

Methods for increasing surface area include chemical etching and abrading. Another method to increase bond strength is to alter the chemistry of the substrate or the adhesive to improve the molecular attraction at the interface. An example of altering the chemistry of the substrate or the adhesive is the use of a primer on the substrate that might develop stronger attraction for functional groups on the adhesive molecules.

Cohesion refers to the bond strength of the material(s) within the adhesive and adherend. Specifically, cohesion is the attraction between like molecules. Wood, for example, has a very high cohesive strength, which makes it an excellent building material. Glue based on polyvinyl acetate (PVAc) exhibits both chemical and mechanical adhesion when joining wood adherends. The PVAc glue reacts chemically to make strong covalent bonds with the cellulose fibers (chemical adhesion) in the wood. Simultaneously, the polymer emulsion permeates the pores in the wood and locks itself around the wood fibers once cured (mechanical adhesion). The strong adhesion between PVAc and wood combined with high PVAc cohesive strength creates a strong adhesive joint. The adhesive joint is so strong that, when under stress, wood adherends glued together with PVAc typically suffer cohesive failure within the wood rather than across the bond interface.

In prior art lithium-seawater batteries 20, bond durability between the ceramic membrane 34 and laminate face ring 38 is adversely affected by contact with seawater over long immersion times. The bond loosens after months of immersion.

A need exists for improved adhesive strength and durability for the bond between the laminate 38 and the ceramic membrane 34.

BRIEF SUMMARY OF THE INVENTION

Accordingly, it is a primary object and general purpose of the present invention to provide improved adhesive strength and durability for the bond between an aluminum laminate and an ion conducting ceramic membrane.

To realize the objects and purposes of the invention, a method of making a ceramic lithium ion conducting membrane is disclosed. The method includes making a liquid slurry of LTAP ($Li_2O$—$Al_2O_3$—$SiO_2$—$P_2O_5$—$TiO_2$) powder. Polyethylene microballoons are added into the liquid slurry. The liquid slurry is converted into porous green tape by casting the slurry onto a biaxally-oriented polyethylene terephthalate (BOPT) film backing, like Mylar™, Melinex™, Hostaphan™ or the like, and then drying the slurry on the film backing. (As used herein, "green" means before further processing.) The porous green tape is laminated onto the top of nonporous green tapes to form a stack. The stack is compressed and then sintered in an oxidizing atmosphere whereupon the polyethylene microballoons decompose to create pores in a top layer of the ceramic lithium ion conducting membrane. Pores can be created on both faces of the stack.

In one embodiment, the pores have a substantially spherical shape.

The pores intersect a top surface of the ceramic lithium ion conducting membrane to form pore openings in the surface. The diameter of the pore openings is smaller than the diameter of the substantially spherical pores.

The objects and purposes of the invention are further realized by a method of making an anode pouch for a lithium-seawater battery. The method includes providing a water impermeable ceramic lithium ion conducting membrane having a porous top layer. The porous top layer includes substantially spherical shaped pores that intersect a top surface of the porous top layer to form pore openings.

The porous top layer of the ceramic lithium ion conducting membrane is adhered to an annular laminate face ring to provide a hermetic seal between the ceramic lithium ion conducting membrane and the annular laminate face ring.

The annular laminate face ring includes a layer of aluminum sandwiched between a layer of adhesive on one side and a layer of an abrasion-resistant waterproof material on an opposite side. The abrasion-resistant layer has a substantially higher melting point than the hot-melt adhesive.

The step of adhering includes melting the layer of adhesive, filling the pores with the adhesive and cooling the adhesive to thereby form mechanical anchors between the adhesive layer and the ceramic lithium ion conducting membrane. This presents a mechanical bond that is impervious to seawater intrusion.

This may be utilized in an anode pouch for a lithium-seawater battery. The anode pouch includes a membrane face assembly adhered to a formed section assembly.

The membrane face assembly includes a water impermeable ceramic lithium ion conducting membrane having a porous top layer. The porous top layer includes substantially spherical shaped pores that intersect a top surface of the porous top layer to form pore openings. An annular laminate face ring is adhered to the porous top layer to provide a hermetic seal. An annular laminate locking ring is adhered to a side of the ceramic lithium ion conducting membrane opposite the annular laminate face ring and the locking ring overlaps the adhesive on the seawater facing laminate on the top side of the membrane. The membrane is sandwiched between two annular laminate sections, doubling the bond length between the external seawater and the inside of the anode pouch. A porous polymer membrane is disposed adjacent to the side of the ceramic lithium ion conducting membrane opposite the annular laminate face ring.

The formed section assembly includes a cup housing and a nickel mesh support disposed in the cup housing. A lithium anode disk is disposed on the nickel mesh support. An electrical lead is connected to the nickel mesh support and extends outside the anode pouch through the seal between the formed section and the seawater face.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DETAILED DESCRIPTION OF THE INVENTION

The invention includes a method for forming an adhesive bond between a solid ceramic electrolyte membrane and a flexible, multilayer aluminum film. More particularly the invention is a method for making an anode pouch for a metal ion-seawater electrochemical cell such as a lithium-seawater electrochemical cell.

A purpose of the invention is to increase the strength and durability of an adhesive bond between a solid ceramic electrolyte membrane and a flexible, multilayer laminate film. The bond is important for the shelf life and service life of a lithium anode pouch. The lithium anode pouch must be a hermetic package. The anode pouch houses a solid lithium metal disk and protects the lithium disk from contact with the atmosphere outside the anode pouch. The anode pouch is one half of a lithium-seawater electrochemical cell. During operation of the cell, the anode pouch is immersed in seawater. The seawater acts as a catholyte. Long-term exposure to seawater can adversely affect the integrity of the bond between the ceramic membrane and the laminate face ring thereby allowing water into the pouch. Oxygen and water react readily with lithium resulting in the reduction of anode electrical capacity and, in the case of water, eventually anode failure through generation of hydrogen gas. Even a little water leakage into the pouch will cause it to fail through passivation of the lithium surface and/or the production of hydrogen gas. The production of hydrogen gas will cause the pouch to bulge and the ceramic membrane to crack.

Figure 3:
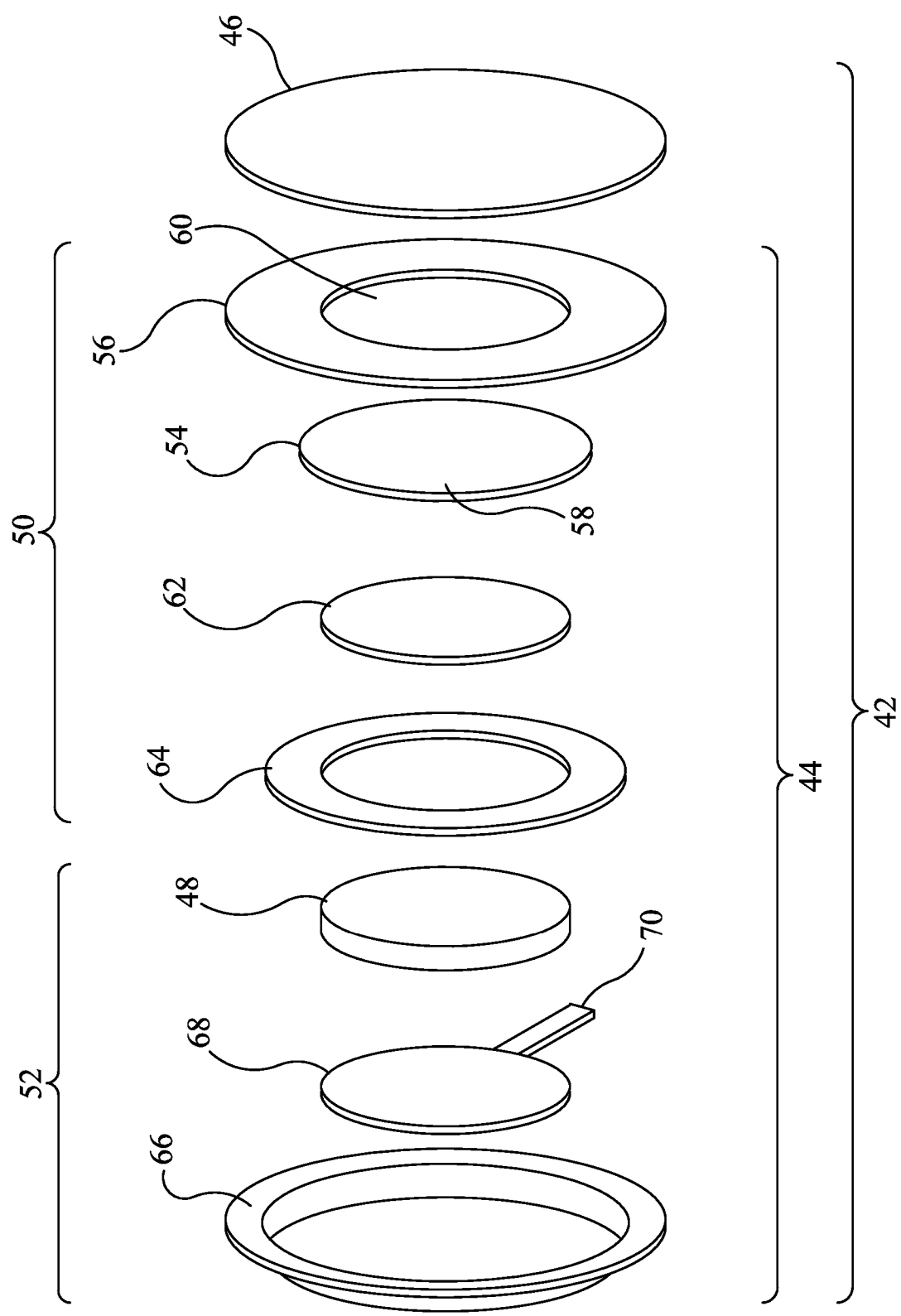
FIG. 3 illustrates an exploded view of the components of one embodiment of a lithium-seawater battery in accordance with the invention.

FIG. 3 is an exploded perspective view showing components of a lithium-seawater battery 42. In the discussion below, the "front side" refers to the right-hand side of components as depicted in FIG. 3 and the "rear side" refers to the left-hand side (mostly hidden from normal view) of components depicted in FIG. 3. Battery cell 42 includes an anode pouch 44 and a cathode 46. The lithium anode disk 48 is encased in anode pouch 44. Battery cell 42 is immersed in seawater.

Anode pouch 44 includes a membrane face assembly 50 and a formed section assembly 52. The membrane face assembly 50 is a heat-sealed assembly that is made of a lithium-ion conducting glass ceramic membrane 54 and a flexible aluminum laminate face ring 56 in the shape of an annulus. The annular seal area 58 between the inner circumferential area of the rear side of the face ring 56 and the outer circumferential area of the front side of the ceramic membrane 54 is very important to the service life of the membrane face assembly 50. The front side of ceramic membrane 54 is exposed to seawater via the opening 60 in face ring 56.

The membrane face assembly 50 includes a porous polymer membrane 62 located behind the ceramic membrane 54 and an annular laminate locking ring 64. An inner annular circumferential area of a front side of locking ring 64 is adhered to an outer annular circumferential area of a rear side of ceramic membrane 54. An outer annular circumferential area of the front side of the locking ring 64 is adhered to a middle circumferential annular area of a rear surface of face ring 56.

The formed section assembly 52 contains a laminate housing or cup 66 which is sized to receive the lithium anode disk 48 and the nickel support. The lithium disk 48 is typically between 1 and 3 inches in diameter and from 0.1 to 0.4 inches thick, although other sizes may be used. The lithium disk 48 is pressed onto a nickel mesh support 68. An electrical lead 70 connects to the nickel mesh support 68 and protrudes between the pouch seal, described below. Cup 66 is filled with an aprotic organic solvent which surrounds nickel mesh support 68, lithium disk 48, and porous membrane 62.

The membrane face assembly 50 and the formed section assembly 52 are joined in a heat-sealing process to form the anode pouch 44. The anode pouch seal is the bond between the outer annular circumferential area of the rear side of face ring 56 and the outer annular circumferential area of the front side of cup 66. In this embodiment, the face ring 56 and the cup 66 are laminates with the same adhesive, so the pouch seal formed between face ring 56 and cup 66 is an effective, long term seal and is not the subject of the present invention. Likewise, the adhesive bond formed between the outer annular circumferential area of the front side of the locking ring 64 and the middle annular circumference of the rear side of face ring 56 is generally an effective seal because the adhesive faces of those two annular pieces are pressed together, melt congruently, interpenetrate, and then cool to form a bond that is impermeable to liquid or gas. If a more critical seal is desired between locking ring 64 and the rear side of ceramic membrane 54, membrane 54 could be made with a porous layer on the rear side. An adhesive layer of locking ring 64 could be joined to this rear side porous layer.

Figure 4:
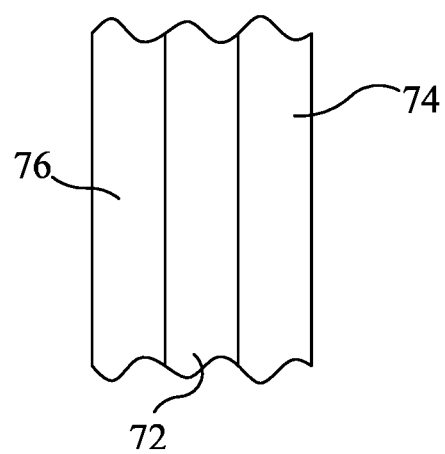
FIG. 4 illustrates a sectional view of aluminum laminates used in a lithium-seawater battery.

As shown in FIG. 4, the cup 66, aluminum laminate locking ring 64 and face laminate ring 56 are each formed of an aluminum layer 72 coated with an adhesive 74 on one side and an abrasion-resistant waterproof layer 76 (for example, polyethylene terephthalate (PET)) on the opposite side. The adhesive 74 is preferably an adhesive with oxygen or polar functionality, e.g. acid-modified polypropylene resin. The thickness of the aluminum layer 72 can be in a range of about 30 microns to about 45 microns although other thicknesses can be used.

Figure 1:
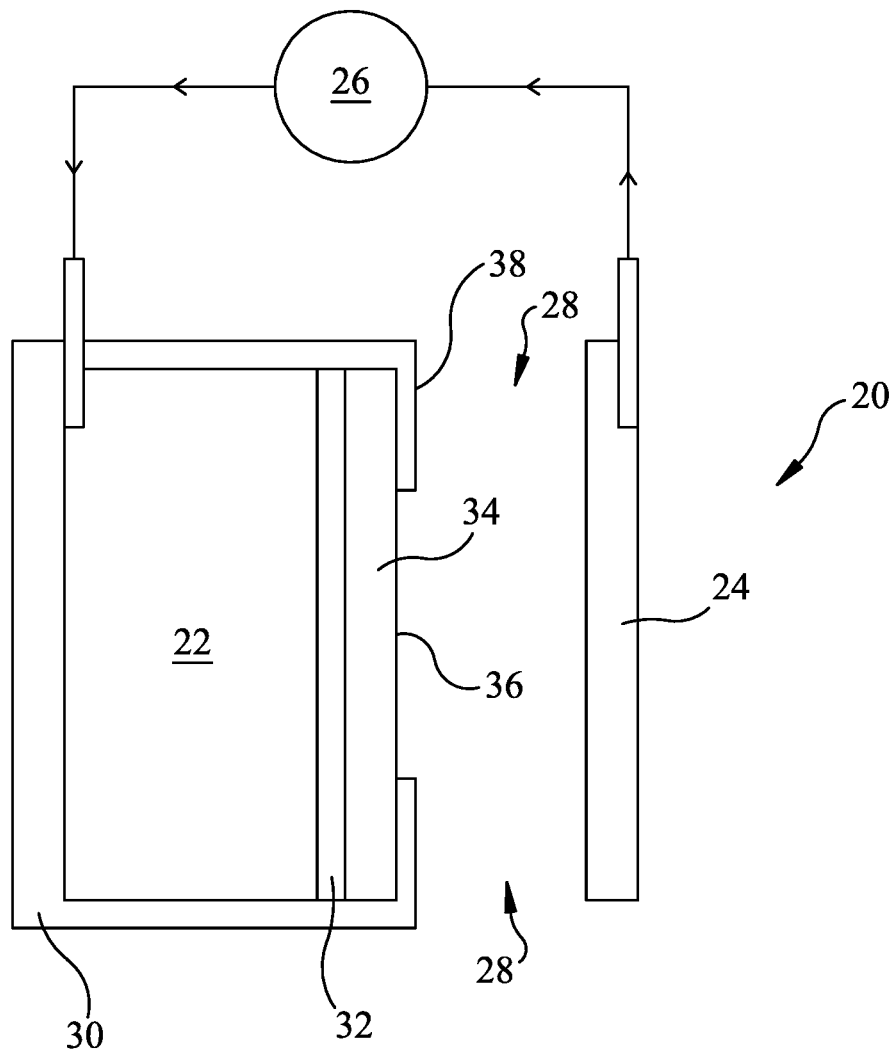
FIG. 1 schematically illustrates a conventional lithium-seawater battery.
Figure 2:
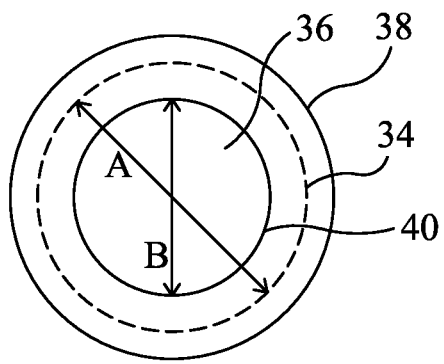
FIG. 2 illustrates the overlapping annular sealing area between a conventional ceramic membrane and an annular laminate face ring in an anode pouch of a conventional lithium-seawater battery.
Figure 5A:
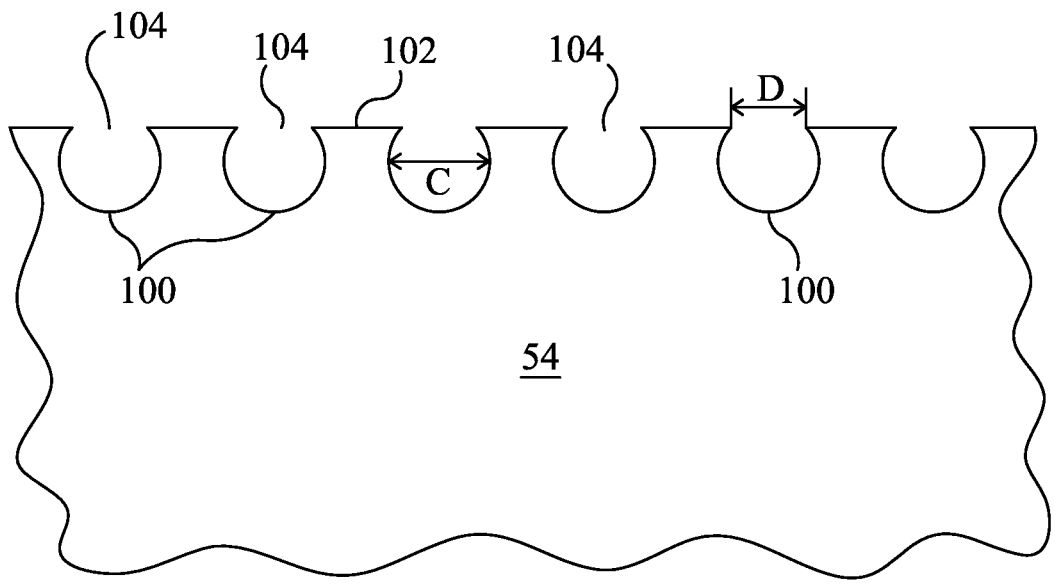
FIG. 5A is an enlarged schematic cross-sectional partial view of a ceramic membrane having a porous top layer.
Figure 5B:
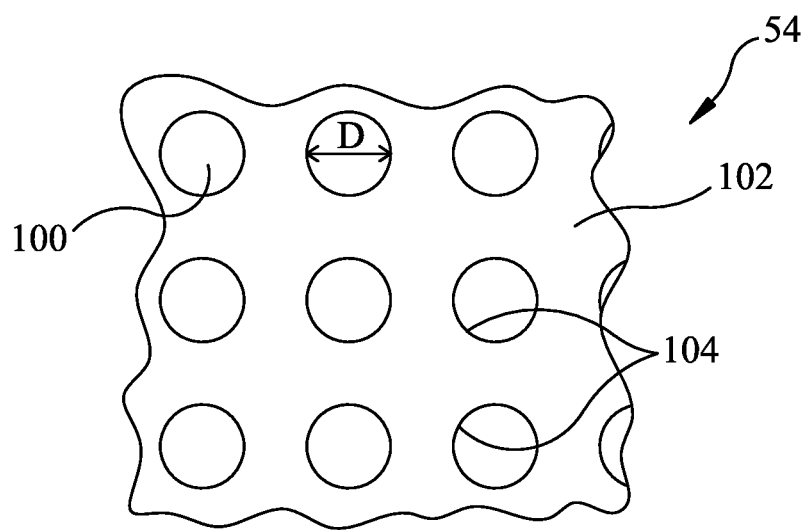
FIG. 5B is a schematic top view of the ceramic membrane of FIG. 5A.

FIG. 5A is an enlarged schematic view of ceramic membrane 54 having a porous top layer. FIG. 5B is a schematic top view of the ceramic membrane 54 of FIG. 5A. The porous top layer of ceramic membrane 54 defines a plurality of spherical pores 100 at and below a surface 102 of the ceramic membrane. Spherical pores 100 are connected to the surface 102 of the ceramic membrane 54 by openings 104. Openings 104 have a diameter D that is smaller than the diameter C of the spherical pores 100. The pores 100 provide mechanical anchor points for the melted adhesive layer 74 of the laminate face ring 56. The benefit of the mechanical anchors provided by pores 100 is the increased adhesive strength between the laminate face ring 56 and the ceramic porous membrane 54 compared to the bond strength between laminate face ring 38 and the conventional nonporous ceramic membrane 34 (See FIG. 1). The shape and spacing of the pores 100 are idealized in FIGS. 5A and 5B. In actual porous ceramic membranes 54, there would be some variation in the pore shape and size and the pores would not be aligned perfectly.

To form adhesive anchors, laminate face ring 56 is heated above the melting temperature of the adhesive layer 74 on one side of the ring 56. Melted laminate face ring 56 is pressed against ceramic membrane surface 102 using 0.5 to 2 pounds of force per square inch of seal area. In one embodiment, the molten adhesive 74 wicks into the pores 100 in ceramic membrane 54 and solidifies when adhesive 74 cools. In other embodiments, gravity or a slight pressure may cause the molten adhesive to enter pores 100. Because of the spherical shape of pores 100, the face ring 56 cannot be removed from the surface 102 of the ceramic membrane 54 except by exceeding the cohesive strength of the chemical bonds in the adhesive 74. Mechanically locking the adhesive 74 into the ceramic surface 102 improves the bond strength between the ceramic membrane 54 and the adhesive. In addition, when in contact with harsh environmental conditions, the inventive bond exhibits greater durability and strength than conventional bonds. Durability and strength are measures of the resistance of the bond to environmental factors such as moisture. Durability of the bond is especially important for the lithium-seawater battery 42 where the bond between ceramic membrane 54 and aluminum laminate face ring 56 is constantly exposed to seawater during the battery's service life.

The spherical pores 100 in the ceramic membrane 54 provide an opportunity for mechanical interlocking. After wetting, filling and curing adhesive 74 within the pores 100, the adhesive is locked to the surface 102 of the ceramic membrane because the "anchor" formed below the surface is wider than the opening 104 of the pore. Mechanical linkages increase bond strength by adding the cohesive forces that hold together the adhesive and the adherend (i.e., the ceramic membrane).

Ceramic membranes 54 with spherical pores 100 have higher bond strength when heat-sealed to a face ring 56 than ceramic membranes 34 without pores. Also, porous ceramic membranes 54 show higher bond durability, as defined by higher peel strength after exposure to 70° C. water for 10 days. It is thought that the improved bond strength and bond durability are the results of the mechanical interlock sites and the increased substrate surface area that provide improved mechanical and chemical adhesion, respectively.

In prototypes of ceramic membranes 54 with pores 100, scanning electron micrographs of the cross-section of the membranes show a thickness of the porous layer (perpendicular to the surface 102) of approximately 15 microns. There appears to be no advantage to making the porous layer thicker because any spherical pores far from the surface 102 are not accessible to the molten adhesive 74, except through other surface connected pores.

Scanning electron micrographs of a conventional ceramic membrane 34 reveal a densely sintered ceramic with surface pores less than 0.5 microns in diameter. In addition, pores in the membrane 34 are straight sided and do not appear to penetrate into the bulk of the non-porous ceramic membrane. Such a geometry would not result in interlocking linkages with the laminate adhesive 74.

Table 1. below shows data on pore dimensions and porosity for some actual porous ceramic membranes 54. The data was compiled using scanning electron micrographs.

TABLE 1

| Average sphere diameter (microns) | Standard deviation of pore diameter (microns) | Average diameter of pore opening at the surface (microns) | Standard deviation of pore opening diameter (microns) | Porosity (%) | Openings per geometric area (cm$^2$) |
|---|---|---|---|---|---|
| 6.5 | 0.2 | 2.7 | 2.6 | 3.7 | 677 × 10$^3$ |

The data in Table 1. show a narrow distribution of sphere diameter C which indicates good control over the pore fabrication process. There is a wide distribution of diameters D of pore openings 104, indicating that the pores 100 are at varying depths as they break through to the surface 102. The pore openings 104 are smaller relative to pore diameter C so that when the adhesive 74 fills and hardens inside the pores, the adhesive is trapped below the surface and ensures a mechanical linkage between the face ring and the ceramic membrane.

The porous ceramic membranes 54 may be used as separators in water-based (aqueous) lithium batteries. In a battery such as battery 20, porous ceramic membrane 54 replaces the conventional non-porous ceramic membrane 34. The membranes 54 are waterproof and highly conductive for lithium ions. The ceramic membranes 54 are coupled with face rings 56 to make a hermetic pouch 44 for a lithium metal anode 48. The pouch 44 prevents contact between water and lithium, which results in high anode efficiency. Equally as important, lithium ions resulting from lithium oxidation are transported across the window of the ceramic membrane 54 to the cathode 46. The ceramic membrane 54 is electronically resistive, which prevents self-discharge of the anode 48 when placed in seawater. For long life and high efficiency, the seal between the ceramic 50 and the laminate face ring 56 must prevent intrusion of water, oxygen and other reactive elements that surround the pouch 44 during its operational and shelf life. To achieve this sealing function, there must be a strong bond between the ceramic 50 and the face ring 56 and the bond must resist the harsh environment surrounding the pouch 44. Typically the ambient environment around the pouch 44 during use is composed of high pH water and dissolved gases as well as other inert materials and biologicals found in seawater. The ceramic membrane 54 is impermeable to water. Lithium ions move through the ceramic membrane 54 from the anode 48 to the cathode 46 to complete the ionic part of the electrochemical circuit during battery operation. Without ion flow the battery cannot not generate electricity. The laminate face pouch functions to maintain a water and oxygen free environment around the lithium anode 48 and to exclude the ambient environment around the pouch from contact with the lithium anode.

An advantage of the porous ceramic 50 is higher bond strength to the face ring 56 compared to the bond strength between the nonporous membrane 34 and the face ring 38, as shown in Table 2. below. Bond strength was investigated using standard (180°) peel tests to measure the force required to peel the laminate face ring 56 off the surface of the ceramic membrane 54. Tests were performed immediately after making the seal and after 10 days of immersion in 70° C. deionized water. High temperature water was used to simulate and accelerate the environmental aging that occurs while the pouch is submerged in seawater for long periods. Deionized water was used because the ceramic membrane 54 will break apart if exposed to seawater while no current is being drawn from the pouch anode. Table 2. shows a higher bond strength between the porous ceramic 50 and laminate face ring 56 compared to the bond strength of the non-porous ceramic 34 and face ring 38. Table 2. also shows better bond durability for the non-porous ceramic bond, as defined by bond strength after immersion in 70° C. deionized water.

TABLE 2

| Specimen | Avg. dry peel strength (lbs. per linear inch) | Standard deviation | Avg. peel strength after water immersion (lbs. per linear inch) | Standard deviation |
|---|---|---|---|---|
| Porous | 13.2 | 0.9 | 10.0 | 0.5 |
| Non-porous | 10.4 | 0.9 | 7.7 | 1.0 |

The invention includes a method of making a ceramic membrane 54 with spherical pores 100 that intersect the surface 102 of the ceramic membrane. The pores 100 have a larger diameter below the surface 102 than at the surface opening 104. Adhesive 74 fills the pores 100 below the surface 102 and provides a mechanical anchor.

The method of making the conventional non-porous ceramic membranes 34 is known. Parts of that known method are disclosed herein for clarity in understanding the method of making the porous ceramic membrane 54.

EXAMPLE

The base powder for making the ceramic membranes 54 is a lithium ion conducting glass ceramic based on Li$_2$O—Al$_2$O$_3$—SiO$_2$—P$_2$O$_5$—TiO$_2$ (LTAP). To produce the LTAP powder, it is melted as a glass, quenched in water, heated to crystallize, and ground into a fine powder.

Ceramic plates are made by a tape casting and sintering method. The density of the LTAP powder was determined to be 2.8 g/cm$^3$ by the Archimedes method and 2.8 g/cm$^3$ was the density goal for the prototype sintered plates. The ceramic plates must be dense, be water impermeable, have high lithium ion conductivity, be acceptably strong, be flat, and be resistant to attack by sea water. The tape casting and sintering process can be easily scaled-up for high production volumes and is more cost effective than the molten glass casting, crystallization and polishing process for glass-type membranes.

Plate production begins by combining the LTAP powder with binders, low level additives such as dispersants, defoamers, and sintering aids in a polyethylene jar used as a ball mill. The mill is closed and rotated on a ball mill rack for milling. The dispersed LTAP in the form of liquid slurry is drained from the ball mill. The slurry is converted into tape by casting onto a biaxally-oriented polyethylene terephthalate (BOPT) film and drying. The gap on the doctor blade is adjusted to a level which provides the required thickness of green tape (dry but not yet sintered). The green tape is formed into sheets by cutting to a size slightly larger than the desired lamination sheet size. Then, the sheets of tape cast LTAP are removed from the BOPT film backing. The stripped sheets are laid on top of one another until the desired number of sheets are used. The number of sheets in a stack is determined by the thickness of each layer and the final desired fired thickness, taking into account shrinkage that occurs. The sheets are laminated either using a uniaxial press or an iso-static press.

After pressure lamination, the green sheet is cut into the desired final shape. The dimensions of the shape must be larger than the final fired shape due to sintering shrinkage, which is determined from firing trials. The parts are then loaded into a furnace and sintered. The process described above is used to make non-porous, conventional ceramic membranes.

To make the ceramic membrane 54 with a top porous layer, pore formers were used in the top layer to form surface porosity. The thickness of the green tape layer with pore formers was in the range of 10-20 microns. The pore formers were polyethylene (PE) microballoons. The non-porous green tape is made by using this slurry or a similar slurry without adding microballoons. The microballoons were either 5 or 10 microns in diameter, although other diameters may be used. For example, microballoons with diameters in a range of about 2 microns to about 25 microns may be used. The slurry with microballoons therein was laminated onto BOPT film and dried between 100 and 150° C. to form the porous green tape. Porous green tape was formed with 5 micron diameter microballoons at 25% and 50% porosity (by volume) and other porous green tape was formed with 10 micron diameter microballoons at 25% and 50% porosity (by volume). Porous green tape formed with other diameters of microballoons and other porosities may be used. For example, porosities may be in a range of about 20% to about 55% or more, by volume. If the porosity is too large, the porous layer may become mechanically weak.

A single, green, tape with microballoons was laminated to nonporous green tapes for a total sintered thickness between 250 and 350 microns. Upon sintering in an oxidizing environment (air or oxygen) at elevated temperature (>500° C.), the polyethylene microballoons decompose, leaving the open pores 100 in the surface 102 of the ceramic membrane 54.

The pores 100 are filled by the molten adhesive 74 from the face ring 56 during the heat-sealing process. The resulting pores 100 filled with polymer adhesive 74 act as mechanical anchor points for the face ring on the ceramic membrane surface thereby increasing the wet and dry bond strength between the face ring and the ceramic membrane.

To prepare peel strength specimens, partial membrane face assemblies 52 were prepared by heat sealing face rings 56 to ceramic membranes 54. The face ring 56 was die cut so that there was a 3/16" overlap with the ceramic membrane 54. The face ring 56 was a thin layer of aluminum with a hot melt adhesive 74 on one side and a heat resistant polymer 76 on the other side. To fabricate the partial membrane face assembly 50, the heat resistant side of the face ring 56 was placed on a heating element and the ceramic membrane 54 was centered over the circular opening hole on the adhesive side of the face ring 56. A polytetrafluoroethylene release liner was placed over the ceramic membrane 54 and the face ring 56.

A press foot with a silicone ring was used to apply pressure (8 psi) to the annular shaped face ring/ceramic seal area during heating and cooling of the element. The element temperature was maintained at 200° C. for 100 seconds, which was high enough to cause the adhesive 74 to melt and long enough for the adhesive to thoroughly wet the outer annular surface of the ceramic membrane 54. Power to the element was then shut off and the press foot lifted when the element temperature was 70° C., which was below the melt point of the adhesive 74.

Peel specimens used to generate the results in Table 2. above were fabricated from the partial membrane face assemblies 50 described above. The membrane face ring 56 was marked to outline four peel strips. The remaining face ring 56 was cut away and the four peel strips were joined to longer laminate tails. An adhesive was applied to the back of the ceramic membrane 54 and the ceramic membrane was mounted to an aluminum support plate.

The face ring 56 was cut so that the four peel strips could be pulled cleanly off the ceramic membrane 54. Each test area was 0.75 inches wide×0.19 inches high in the shape of the arc of the face ring to ceramic seal.

To measure the peel force, the specimen was placed into the jaws of an Instron®. The jaw holding the aluminum support plate contained the load cell and moved the support plate away from the lower jaw at 0.1 inch per minute. The lower jaw was stationary and held the face ring strip which was folded over approximately 180°.

Figure 6:
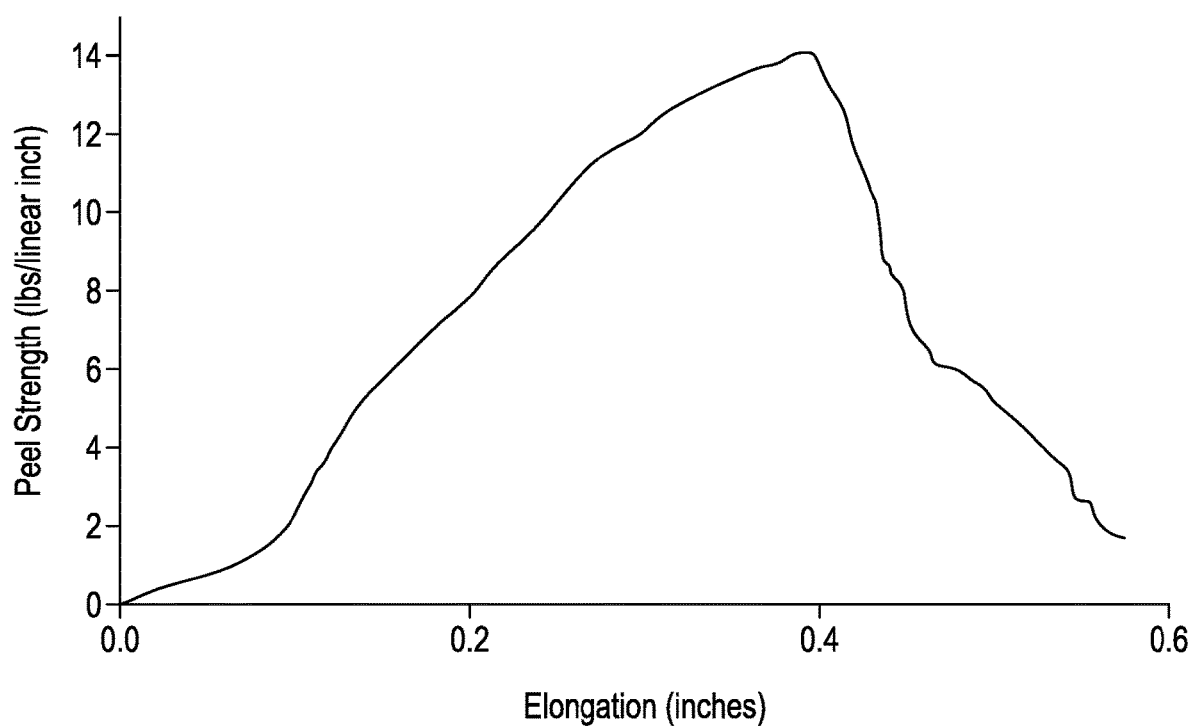
FIG. 6 shows a graph of adhesive strength as a function of elongation as the laminate is peeled off the ceramic membrane.

FIG. 6 shows a typical curve for the peel tests performed in this study. The force recorded by the load cell (i.e., peel strength) is shown as a function of the length of the extension or elongation. Peel force increased and decreased according to the bond length as the specimen was peeled across its arc. Peel strength was a maximum when the bond line stretched the full length of the arc. The maximum peel strength for each specimen was normalized by the maximum possible bond length (0.75 inches). The data in Table 2. above show average peel strengths and standard deviations for eight specimens at each test condition.

Rather than forming pores 100 across the complete surface 102 of the ceramic membrane 54, the pores 100 could be localized to affect the adhesion in a specific area of the ceramic membrane. The diameter of the pores 100 can be controlled and may play a role in adhesive strength. The number of pores per geometric area can also be controlled. In another variation, the ceramic membrane 54 may be formed with pores 100 on both the front and rear surfaces. Pores on the rear surface of ceramic membrane 54 would result in an improved bond between the inner circumferential area of the front side of aluminum laminate locking ring 64 (See FIG. 3) and the rear side of ceramic membrane 54.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A method of making an anode pouch for a lithium-seawater battery comprising:
   providing a water impermeable ceramic lithium ion conducting membrane having a porous top layer, wherein the porous top layer has a plurality of substantially spherical shaped pores formed therein that intersect a top surface of the porous top layer to form pore openings; and
   adhering the porous top layer of said ceramic lithium ion conducting membrane to an annular laminate face ring to provide a hermetic seal between the ceramic lithium ion conducting membrane and the annular laminate face ring;

wherein the annular laminate face ring comprises an aluminum layer, an adhesive layer on a first side of the aluminum layer, and an abrasion-resistant waterproof material layer on a second, opposite side of the aluminum layer;

wherein said step of adhering comprises:

melting the annular laminate face ring adhesive layer;

positioning the water impermeable ceramic lithium ion conducting membrane porous top layer against the melted adhesive layer whereby the melted adhesive enters the porous top layer pore openings; and cooling the positioned water impermeable ceramic lithium ion conducting membrane and annular laminate face ring.

2. The method of claim 1, further comprising adhering an annular laminate locking ring to said ceramic lithium ion conducting membrane on a bottom layer opposite said porous top layer.

3. The method of claim 1, wherein:

the water impermeable ceramic lithium ion conducting membrane has a porous bottom layer, wherein the porous bottom layer has a plurality of substantially spherical shaped pores formed therein that intersect a bottom surface of the porous bottom layer to form pore openings; and further comprising adhering an annular laminate locking ring to the ceramic lithium ion conducting membrane porous bottom layer.

* * * * *